United States Patent
Diwinsky et al.

(10) Patent No.: US 9,785,919 B2
(45) Date of Patent: Oct. 10, 2017

(54) AUTOMATIC CLASSIFICATION OF AIRCRAFT COMPONENT DISTRESS

(71) Applicant: General Electric Company, Schenectady, NY (US)

(72) Inventors: David Scott Diwinsky, West Chester, OH (US); Ser Nam Lim, Niskayuna, NY (US); Xiao Bian, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 14/964,922

(22) Filed: Dec. 10, 2015

(65) Prior Publication Data

US 2017/0169400 A1    Jun. 15, 2017

(51) Int. Cl.
| | | |
|---|---|---|
| G06T 7/00 | (2017.01) | |
| G06K 9/66 | (2006.01) | |
| G06Q 10/00 | (2012.01) | |
| G06F 17/30 | (2006.01) | |
| G06K 9/62 | (2006.01) | |

(52) U.S. Cl.
CPC ......... *G06Q 10/20* (2013.01); *G06F 17/3028* (2013.01); *G06K 9/6267* (2013.01); *G06T 7/0081* (2013.01); *G06T 2207/20112* (2013.01)

(58) Field of Classification Search
USPC ................ 382/141, 149, 155–159
See application file for complete search history.

(56) References Cited

U.S. PATENT DOCUMENTS

| | | | |
|---|---|---|---|
| 4,098,450 A | 7/1978 | Keller et al. | |
| 4,830,934 A | 5/1989 | Ferrigno et al. | |
| 6,529,620 B2 | 3/2003 | Thompson | |
| 6,532,800 B1 | 3/2003 | Boeckstiegel et al. | |
| 6,981,423 B1 * | 1/2006 | Discenzo | G01L 3/12 73/800 |
| 7,020,595 B1 * | 3/2006 | Adibhatla | G05B 23/0254 700/30 |
| 7,027,953 B2 * | 4/2006 | Klein | G01H 1/006 702/182 |
| 7,043,348 B2 * | 5/2006 | Uluyol | F02C 9/00 701/100 |
| 7,103,610 B2 | 9/2006 | Johnson et al. | |
| 7,209,814 B2 | 4/2007 | Kipersztok et al. | |
| 7,260,501 B2 | 8/2007 | Pattipatti et al. | |
| 7,477,960 B2 * | 1/2009 | Willis | G05B 19/4184 700/110 |
| 7,536,277 B2 | 5/2009 | Pattipatti et al. | |
| 7,995,829 B2 * | 8/2011 | Ferro | G01N 29/0645 250/492.2 |

(Continued)

*Primary Examiner* — Ishrat I Sherali
(74) *Attorney, Agent, or Firm* — Pamela A. Kachur (57) ABSTRACT

Systems and methods for automatically identifying and classifying distress of an aircraft component are provided. In one embodiment, a method includes accessing one or more digital images captured of the aircraft component and providing the one or more digital images as an input to a multi-layer network image classification model. The method further includes generating a classification output for the one or more images from the multi-layer network image classification model and automatically classifying the distress of the aircraft component based at least in part on the classification output.

20 Claims, 5 Drawing Sheets

(56) References Cited

U.S. PATENT DOCUMENTS

| | | | |
|---|---|---|---|
| 8,112,368 B2* | 2/2012 | Eklund | G06F 11/008 |
| | | | 382/159 |
| 8,208,711 B2* | 6/2012 | Venkatachalam | G01N 23/04 |
| | | | 250/306 |
| 8,818,078 B2* | 8/2014 | Telfer | G06T 7/0004 |
| | | | 382/149 |
| 8,855,954 B1* | 10/2014 | Bickford | G07C 3/08 |
| | | | 702/63 |
| 9,014,460 B2* | 4/2015 | Twerdochlib | F01D 21/14 |
| | | | 382/100 |
| 2006/0064291 A1 | 3/2006 | Pattipatti et al. | |
| 2009/0240471 A1 | 9/2009 | Novis | |
| 2009/0266150 A1 | 10/2009 | Novis | |
| 2012/0041575 A1* | 2/2012 | Maeda | G05B 23/024 |
| | | | 700/80 |
| 2014/0121935 A1 | 5/2014 | Zhang et al. | |
| 2015/0081193 A1 | 3/2015 | Gordon et al. | |

* cited by examiner

AUTOMATIC CLASSIFICATION OF AIRCRAFT COMPONENT DISTRESS

FIELD OF THE INVENTION

The present subject matter relates generally to assessing distress of components, such as aircraft components.

BACKGROUND OF THE INVENTION

An aircraft can include an engine, such as a gas turbine engine, for propulsion of the aircraft. A gas turbine engine can include a fan and a core arranged in flow communication with one another. The core of the gas turbine engine generally includes an air flow path having, in serial air flow order, a compressor section, a combustion section, a turbine section, and an exhaust section. The compressor section can include one or more compressors used to compress air. The compressed air can be provided to the combustion section where it is mixed with fuel and burned to provide combustion gases. The combustion gases can be used to support operation of the compressor section and the turbine section of the gas turbine engine.

Components of aircraft engines and other components can be subject to stresses during operation. Periodically, components of aircraft engines need to be inspected to determine the condition of the aircraft component and to check for defects. Manual inspection of aircraft components can be time consuming and can be subject to inaccuracies resulting from human error.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of automatically classifying distress of an aircraft component. The method can include accessing, by one or more computing devices, one or more digital images captured of an aircraft component. The method can include providing, by the one or more computing devices, the one or more digital images as an input to a multi-layer network image classification model. The method can further include generating, by the one or more computing devices, a classification output for the one or more images from the multi-layer network image classification model and automatically classifying, by the one or more computing devices, the distress of the aircraft component based at least in part on the classification output.

Another example aspect of the present disclosure is directed to a system for inspecting a component of a gas turbine. The system includes one or more image capture devices configured to a capture a digital image of a component of a gas turbine. The system further includes at least one display device, one or more processors, and one or more memory devices. The one or more memory devices can store a multi-layer network image classification model. The one or more memory devices can store computer-readable instructions that when executed by the one or more processors cause the one or more processors to perform operations. The operations can include accessing one or more digital images captured of the component of the gas turbine; providing the one or more digital images as an input to the multi-layer network image classification model; generating a classification output for the one or more images from the multi-layer network image classification model; automatically classifying distress of the component of the gas turbine into one of a plurality of distress levels based at least in part on the classification output; and providing the distress level of the component of the gas turbine for display on the one or more display devices.

Yet another example aspect of the present disclosure is directed to one or more tangible, non-transitory computer-readable media storing computer-readable instructions that when executed by one or more processors cause the one or more processors to perform operations. The operations include accessing one or more digital images captured of the component; providing the one or more digital images as an input to a multi-scale fully convolutional model image classification model; and generating a segmentation map for the one or more images from a multi-scale fully convolutional model image classification model. The segmentation map can indicate one or more areas of distress on the component. The operations can further include automatically classifying distress of the component into one of a plurality of distress levels based at least in part on the segmentation map.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for classifying distress of an component, such as a blade of gas turbine engine used in an aircraft. As used herein, "distress" of a component can refer to an area or portion of an aircraft component associated with wear and tear, defect(s), anomaly(s), imperfection(s), irregularity(s), deformity(s), or other the like.

Example aspects of the present disclosure will be discussed with classifying distress of a blade of a gas turbine engine used in an aircraft for purposes of illustration and discussion. Those of ordinary skill in the art, using the disclosures provided herein, will understand that example aspects of the present disclosure can be used to classify distress on other components, such as other aircraft components, components of gas turbines used in power generation (e.g., land based gas turbines), and other components.

According to particular aspects of the present disclosure, one or more digital images of the aircraft component can be captured and provided to a multi-layer image classification model. The multi-layer image classification model can be a deep neural network having multiple processing layers that has been trained to process digital images and provide a classification output indicating areas of distress on the aircraft component. Any multi-layer deep learning network suitable for classifying portions of images can be used without deviating from the scope of the present disclosure.

In particular embodiments, the multi-layer image classification model can be a multi-scale fully convolutional model that includes a plurality of different multi-layer networks, each associated with a different scale. The scale of each multi-layer network can be indicative of the receptive field or "field of vision" for the multi-layer network. The receptive field represents the size of a portion of the input image processed by the multi-layer network to generate an output. The receptive field can be as small as one pixel of the input image or as large as the entire input image. The outputs generated by each multi-layer network in the multi-scale fully convolutional model can be concatenated to generate a concatenated output. The concatenated output can be further processed by the model (e.g., using logistic regression) to generate the classification output.

The classification output can be processed to classify the distress of aircraft component based at least in part on an amount of distress indicated in the classification output. In some embodiments, the classification output can be a segmentation map. The segmentation map can indicate areas of distress on the aircraft component. For instance, the segmentation map can include a plurality of pixels. A first pixel value can be assigned to a pixel when the portion of the aircraft component corresponding to the pixel is associated with an area of distress. A second pixel value can be assigned to a pixel when the portion of the aircraft component corresponding to the pixel is not associated with an area of distress. The aircraft component can be classified into one of a plurality of distress levels based at least in part on the number of pixels having a pixel value associated with distress in the segmentation map.

In this way, example aspects of the present disclosure can have a technical effect of automatically classifying distress of an aircraft component simply by capturing and processing digital images of the aircraft component. As a result, aircraft component inspection can be conducted with high reliability and increased efficiency relative to manual inspection of the aircraft components.

Figure 1:
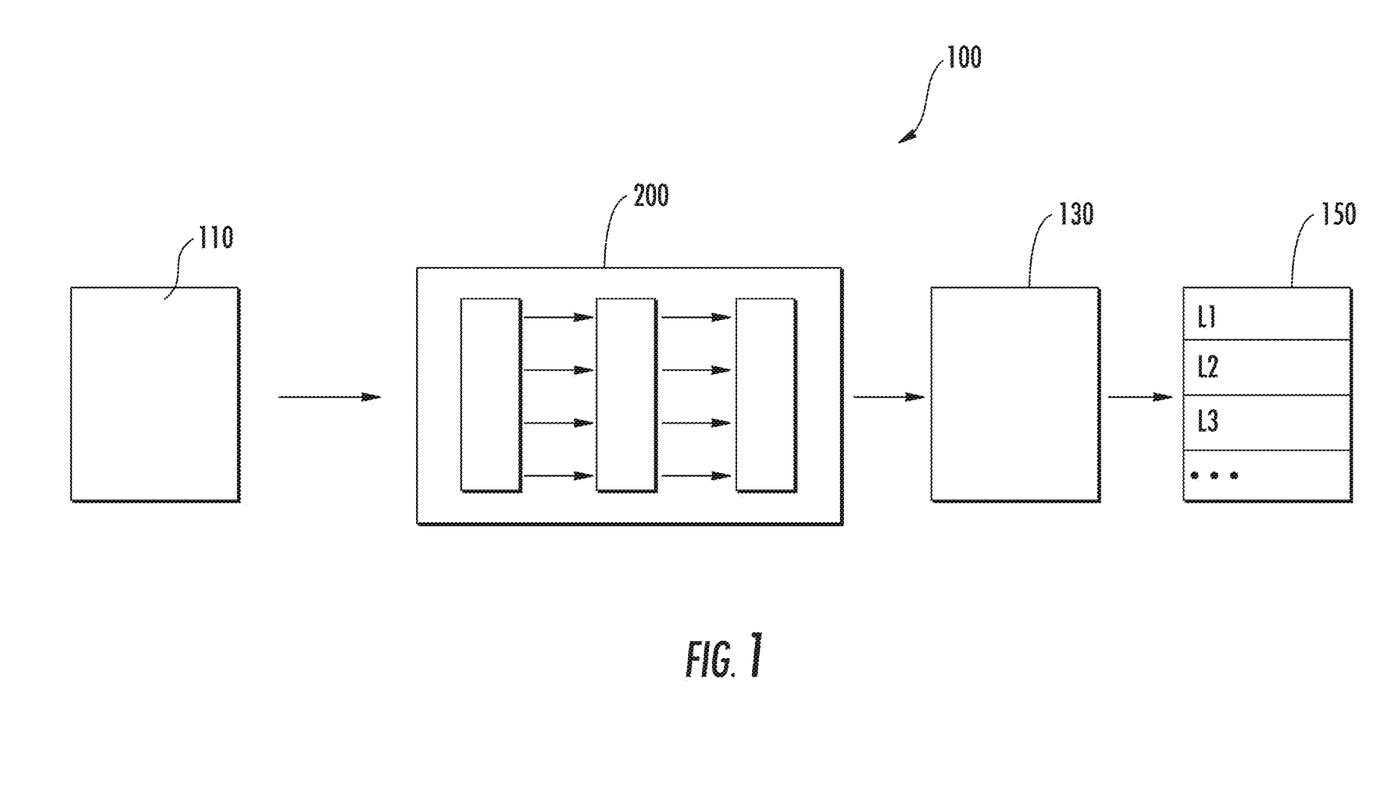
FIG. 1 depicts an overview of automatically classifying distress of an aircraft component according to example embodiments of the present disclosure.

FIG. 1 depicts an example schematic 100 of automatically classifying distress of an aircraft component according to example embodiments of the present disclosure. A digital image 110 can be captured of an aircraft component, such as a blade of a gas turbine engine. In some embodiments, the digital image 110 can be captured of the blade when the engine is on wing and fully assembled, off wing and fully assembled, off wing and partially assembled, or fully disassembled. The digital image 110 can be captured using any suitable digital image capture device, such as a digital camera. In some embodiments, multiple images can be captured of the aircraft component. The multiple images can be stitched together and/or otherwise processed to generate the digital image 110. In some embodiments, the multiple images can be stitched together and processed to generate digital image 110 providing a three-dimensional model of the aircraft component.

Figure 2:
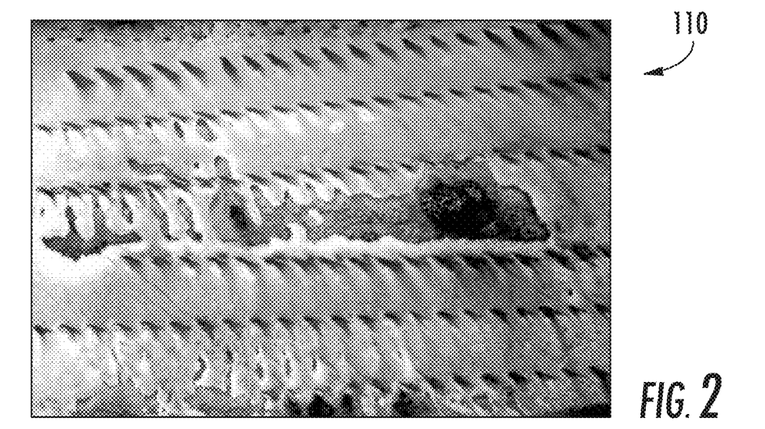
FIG. 2 depicts an example multi-layer network image classification model according to example embodiments of the present disclosure.

An example digital image 110 of a blade of a gas turbine engine used for propulsion of the aircraft is shown in FIG. 2. As shown in the digital image 110, the blade includes various regions of distress.

Referring to FIG. 1, the digital image 110 can be provided to an image classification model 200. The image classification model 200 can be a multi-layer image classification model (e.g., a neural network) that includes a plurality of processing layers. The model 200 can process the image 110 to generate one or more outputs that are used to classify the distress of the aircraft component. The model 200 can be implemented in a variety of manners.

In some embodiments, machine learning techniques can be used to evaluate training images using the model 200 and develop classifiers that correlate features depicted in images with particular categories (e.g., distress and/or not distress). After the model 200 has been adequately trained using, for instance, a machine learning process, the model can be employed to analyze the digital image 110 of the aircraft component and provide a classification output as will be discussed in more detail below. In some embodiments, the training images used to train the model 200 can include images of aircraft components with known levels of distress. The known outputs for training the model can be segmentation maps corresponding to the training images.

In some embodiments, the multi-layer image classification model can be a deep neural network including a plurality of processing layers. The neural network can be of many different sizes and can have any number of layers and levels of connectedness between layers. In some embodiments, the neural network can include one or more convolutional layers, rectified linear unit layers, pooling layers, deconvolution layers, and other layers. In some embodiments, a multi-scale fully convolutional model can be used as the model 200. Details concerning an example multi-scale fully convolutional model will be discussed in more detail below with respect to FIG. 4.

Referring to FIG. 1, the digital image 110 can be provided to the model 200 to generate a classification output 130. The classification output 130 can be a set of data indicative of locations of the digital image 110 that are classified by the model as corresponding to distress in an aircraft component. For instance, the classification output 130 can include a set of data providing confidence scores indicative of whether a certain portion of a digital image 110 corresponds to distress.

Figure 3:
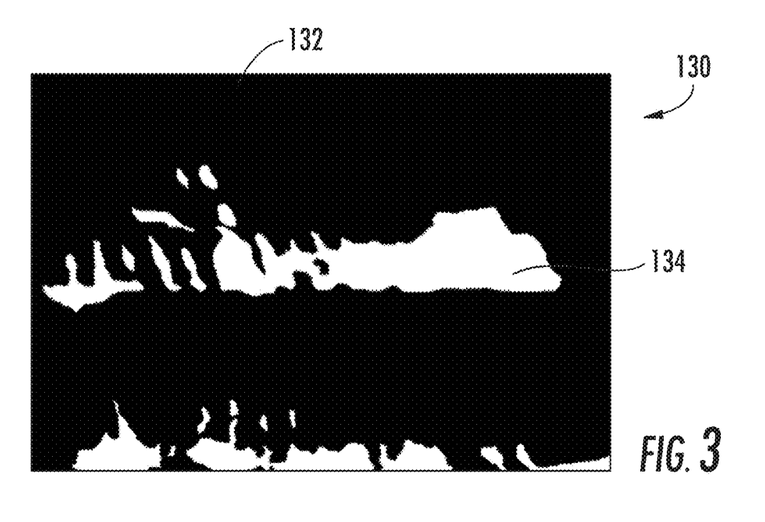
FIG. 3 depicts a flow diagram of an example method according to example embodiments of the present disclosure.

In some embodiments, the classification output 130 can include a segmentation map. An example classification output 130 that includes a segmentation map is depicted in FIG. 3. As shown, the segmentation map includes a plurality of pixels 132 having a first pixel value (e.g., a pixel value corresponding to black) for areas of the aircraft component that are not classified by the model 200 as having distress. The segmentation map can further include a plurality of pixels 134 having a second pixel value (e.g., a pixel value corresponding to white) for aircraft component that are classified by the model 200 as having distress.

As shown in FIG. 1, the classification output 130 (e.g., a segmentation map) can be analyzed to automatically classify the distress of the aircraft component in a classification system 150. For instance, in one embodiment, the number of pixels corresponding to an area of distress can be used to determine a distress score for the aircraft component. The distress score can be used to classify the distress in the classification system 150.

The classification system 150 can include a plurality of distress levels (e.g., L1, L2, L3, . . . , etc.). Each distress level can correspond to a different level of distress of the aircraft component. For instance, in one example classification system, a distress level of L1 can signify a limited about of distress. A distress level of L2 can signify a minor amount of distress. A distress level of L3 can signify moderate stress. A distress level of L4 can signify a high level of distress. A distress level of L5 can signify a very high level of distress. Higher distress levels can indicate even higher amounts of distress. A classification system having five levels of distress is discussed for purposes of illustration and discussion. Those of ordinary skill in the art, using the disclosures provided herein, will understand that more or fewer distress levels can be used without deviating from the scope of the present disclosure.

In some embodiments, the distress of the aircraft component can be classified in a distress level based on a distress score computed for the aircraft component. For instance, a distress score that falls within a first defined range can be classified in a first distress level. A distress score that falls within a second defined range can be classified in a second distress level. A distress score that falls within a third defined range can be classified in a third distress level, and so forth.

In some embodiments, each distress level can correspond to a different maintenance action to be taken with respect to the aircraft component. For instance, lower distress levels can indicate that no repair action needs to be taken. Mid-level distress levels can indicate that moderate repair needs to be performed on the aircraft component. Higher distress levels can indicate that a major repair action and/or replacement of the aircraft component is required.

In some embodiments, the component can be subdivided into sub-portions. The distress of each sub-portion can be automatically classified according to example embodiments of the present disclosure. A maintenance action can then be performed depending on the classification of the distress in each sub-portion.

Figure 4:
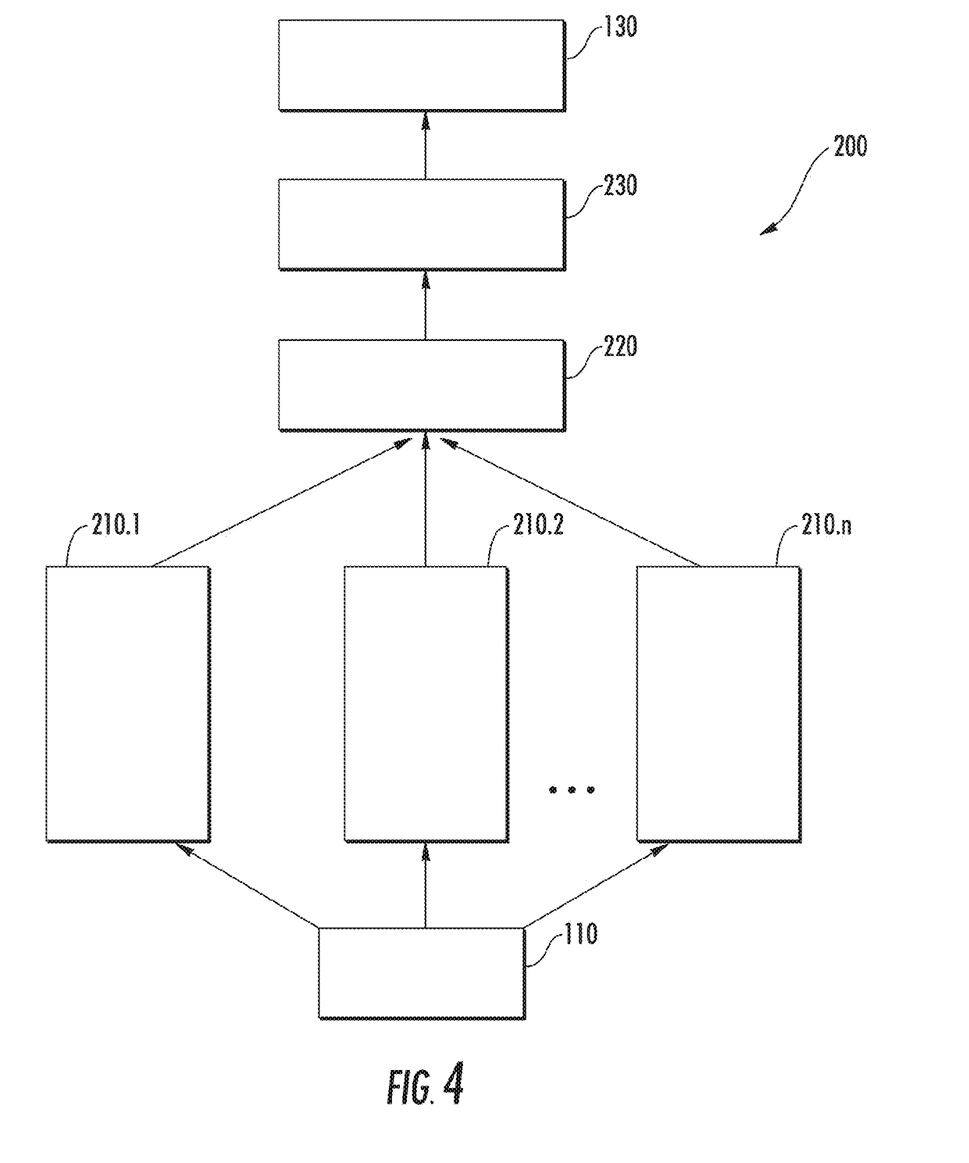
FIG. 4 depicts an example input image of an aircraft component according to example embodiments of the present disclosure.

FIG. 4 depicts an example multi-scale network fully convolutional model 200 that can be used to classify distress according to example embodiments of the present disclosure. As shown, the model 200 can include a plurality of multi-level networks 210.1, 210.2, . . . 210.n. Each multi-level network 210.1, 210.2, . . . 210.n. can have multiple processing layers configured to process a portion of the digital image 110 and generate an output (e.g., a segmentation map). For instance, each multi-level network can include one or more convolutional layers, one or more pooling layers, one or more rectified linear unit layers, one or more deconvolution layers, and other processing layers. Three multi-level networks 210.1, 210.2, and 210.n are depicted in FIG. 4 for purposes of illustration and discussion. Those of ordinary skill in the art, using the disclosures provided herein, will understand that more or fewer multi-level networks can be used without deviating from the scope of the present disclosure.

Each multi-level network 210.1, 210.2, and 210.n can be associated with a different scale. The scale of the network refers to the receptive field of the network. The receptive field is indicative of the size of the portion of the digital image 110 processed by the multi-level network 210.1, 210.2, and 210.n to generate an output. For instance, the receptive field can range from a single pixel of the digital image 110, to a portion of the digital image 110, to the entire digital image 110. For instance, the receptive field for network 210.1 can be associated with a single pixel of the digital image 110. The receptive field 210.2 can be associated with a portion or fragment of the digital image 110 (e.g., a 20×20 pixel array). The receptive field for network 210.n can be the entire digital image 110. In this way, the different networks 210.1, 210.2, and 210.n can process the digital image 110 at different scales to achieve improved processing of the digital image.

The output of each of the multi-level networks 210.1, 210.2, and 210.n (e.g., segmentation maps generated by each of the multi-level networks 210.1, 210.2, and 210.n) can be concatenated to generate a concatenated output 220 (e.g., a concatenated segmentation map). The concatenated output 220 can be provided to a post processing layer 230 for final refinement and processing to generate the classification output 130. For instance, in one embodiment, the post processing layer 230 can be a logistic regression layer used to classify pixels in a segmentation map as belong to an area of distress or as not belonging to an area of distress.

Figure 5:
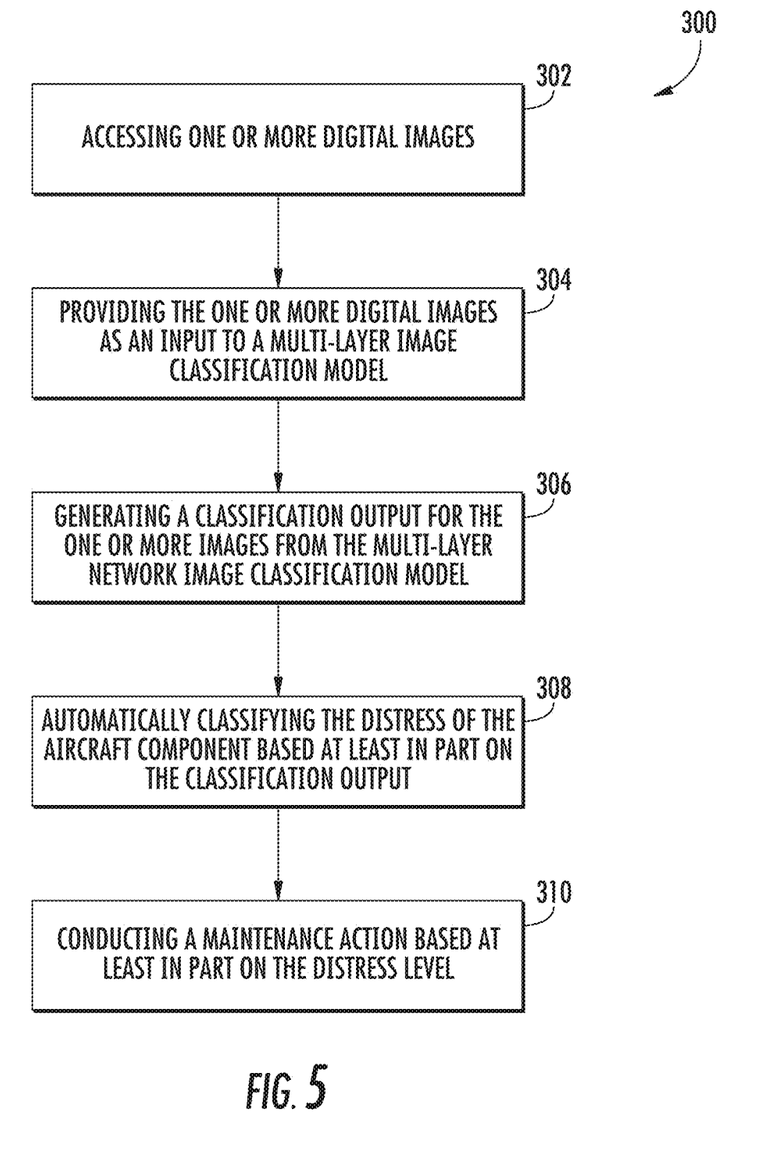
FIG. 5 depicts an example segmentation map generated according to example embodiments of the present disclosure.

FIG. 5 depicts a flow diagram of an example method (300) according to example embodiments of the present disclosure. The method (300) can be implemented using one or more computing devices, such as the one or more computing devices in the system 400 depicted in FIG. 6. In addition, FIG. 5 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded in various ways without deviating from the scope of the present disclosure.

At (302), the method can include accessing one or more digital images of an aircraft component, such as a blade of a gas turbine engine. For instance, a digital image captured by an image capture device (e.g., a digital camera) can be accessed from a memory device. As one example, the digital image 110 shown in FIG. 2 can be accessed from a memory device.

At (304) of FIG. 5, the method can include providing the one or more digital images as an input to a multi-layer image classification model (e.g., a neural network). For instance, the digital image 110 can be provided to the model 200 as shown in FIG. 1. In some embodiments, the model can be a multi-scale fully convolutional model as described with reference to FIG. 4. The multi-scale fully convolutional model can include a plurality of multi-layer networks. Each multi-layer network can be associated with a different size receptive field with respect to the one or more digital images.

At (306) of FIG. 5, the method can include generating a classification output for the one or more images from the multi-layer network image classification model. For instance, the model 200 can generate the classification output 130 as shown in FIG. 1. In embodiments where the model includes a multi-scale fully convolutional model, generating the classification output can include concatenating outputs from each of the plurality of multi-layer networks to determine a concatenated output and generating the classification output based at least in part on the concatenated output.

In example embodiments, the classification output 130 can be a segmentation map as shown in FIG. 3. The segmentation map can include a plurality of pixels. The pixel value of each of the plurality of pixels can correspond to whether the pixel is associated with an area of distress on the aircraft component. For instance, a pixel can have a first pixel value if the pixel corresponds to an area without distress. A pixel can have a second pixel value if the pixel corresponds to an area with distress.

At (308) of FIG. 5, the method can include automatically classifying the distress of the aircraft based at least in part on the classification output. For instance, the classification output can be used to classify the distress into one of a plurality of distress levels as part of a classification system (e.g., the classification system 150 depicted in FIG. 1).

In one embodiment, automatically classifying the distress can include processing a segmentation map to generate a distress score. The distress score can be calculated based at least in part on the number of pixels in the segmentation map determined by the model to be associated with an area of distress on the aircraft component. For instance, the distress score can be determined as a function of the total area of the pixels associated with distress in the segmentation map relative to the total area of the segmentation map.

The distress of the aircraft component can be classified into one of a plurality of distress levels based on the distress score. For instance, if the distress score falls within a first range associated with a first distress level, the distress can be classified into the first distress level. If the distress score falls within a second range associated with a second distress level, the distress can be classified into the second distress level. If the distress score falls within a third range associated with a third distress level, the distress can be classified into the third level, and so forth.

At (310), the method can include performing a maintenance action based at least in part on the classification of the distress. The maintenance action can include conducting a repair of the aircraft component and/or replacing the aircraft component. In some embodiments, the maintenance action can correspond to the distress level of the aircraft component. For instance, lower distress levels can indicate that no repair action needs to be taken. Mid-level distress levels can indicate that moderate repair needs to be performed on the aircraft component. Higher distress levels can indicate that a major repair action and/or replacement of the aircraft component is required.

Figure 6:
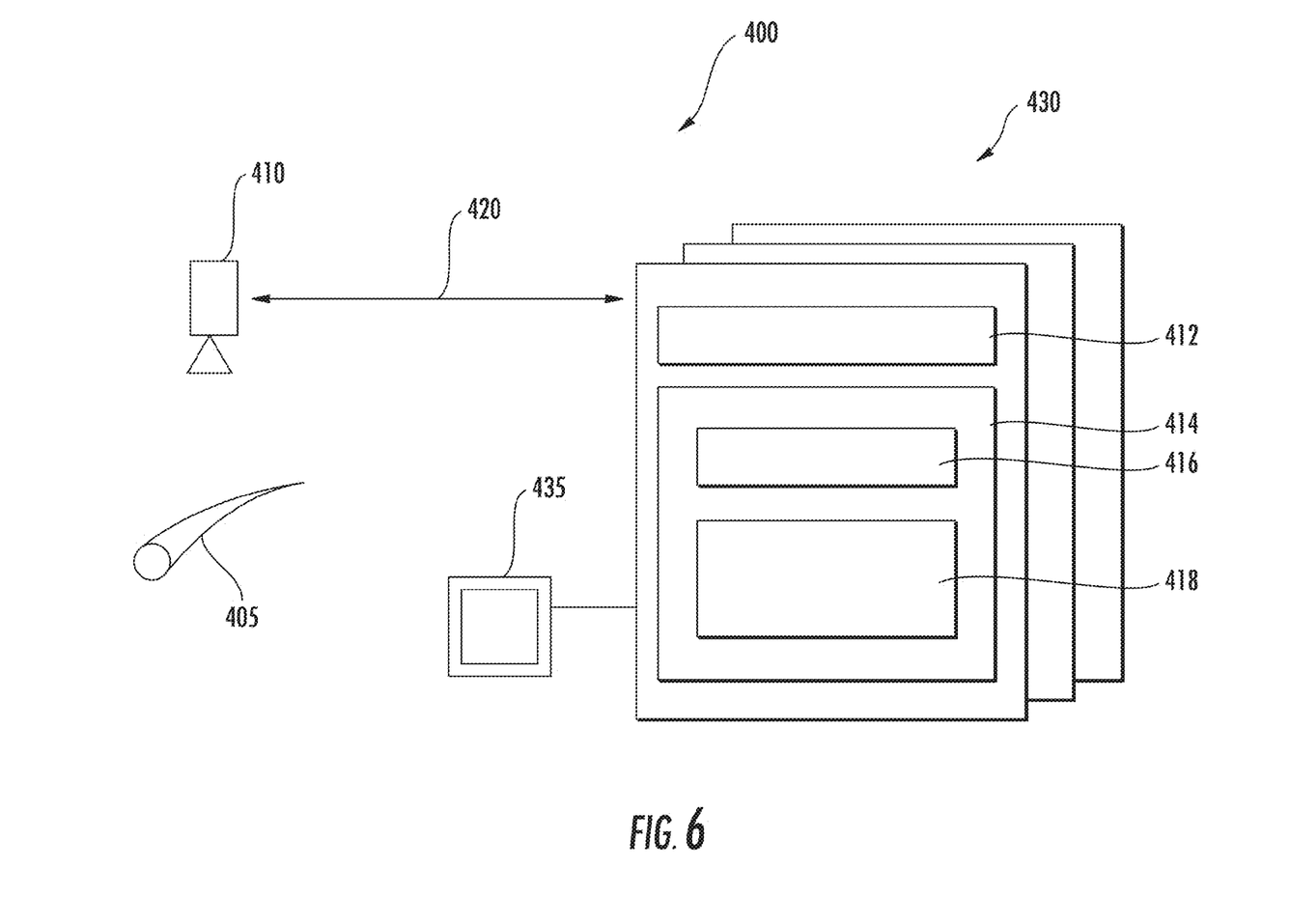
FIG. 6 depicts an example system according to example embodiments of the present disclosure.

FIG. 6 depicts an example system 400 for inspecting and classifying distress of aircraft components according to example embodiments of the present disclosure. The system can include an image capture device 410 and one or more computing devices 430 in communication with the image capture device 410 over a communication interface 420.

The image capture device 410 can be configured to capture digital images of an aircraft component, such as blade 405 of a gas turbine engine. The image capture device 410 can be a digital camera. Any suitable digital camera can be used without deviating from the scope of the present disclosure. The image capture device 410 can also include other imaging technology (e.g., a scanner) configured to capture images of the aircraft component.

The computing device(s) 430 can include one or more processors 412 and one or more memory devices 414. The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. In some embodiments, the one or more processors 412 and one or more memory devices 414 can be located across multiple systems, devices, or locales.

The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. The instructions 416 can be software written in any suitable programming language or can be implemented in hardware. In some embodiments, the instructions 416 can be executed by the one or more processors 412 to cause the one or more processors to perform operations for classifying distress of an aircraft component, such as one or more of the operations shown in FIG. 5.

The memory devices 414 can further store data 418 that can be accessed by the processors 412. The data 418 can include, for instance, a multi-layer network model that has been trained to classify images according to example embodiments of the present disclosure.

The one or more computing devices 430 can further include and/or be in communication with one or more display devices 435 or other output devices (e.g., audio output devices). In some embodiments, the computing devices 430 can be configured to display classification information determined for the aircraft component 405 for performance of a maintenance action.

The communications interface 420 can include any suitable interface for communicating between the image capture device 410 and the one or more computing devices 430 and can include any number of wired or wireless links. Communication can be performed across the communication interface 420 using any suitable protocol.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of automatically classifying distress of a component of a gas turbine engine, the method comprising:
accessing, by one or more computing devices, one or more digital images captured of the component of the gas turbine engine;
providing, by the one or more computing devices, the one or more digital images as an input to a multi-layer network image classification model;
generating, by the one or more computing devices, a classification output for the one or more images from the multi-layer network image classification model;
automatically classifying, by the one or more computing devices, the distress levels of the component of the gas turbine engine based at least in part on the classification output; and
providing the distress level of the component of the gas turbine for display on one or more display devices.

2. The method of claim 1, wherein the multi-layer image classification model comprises a multi-scale fully convolutional model.

3. The method of claim 2, wherein the multi-scale fully convolutional model comprises a plurality of multi-layer networks, each multi-layer network associated with a different size receptive field.

4. The method of claim 3, wherein generating, by the one or more computing devices, a classification output from the multi-layer network image classification model comprises:
concatenating outputs from each of the plurality of multi-layer networks to determine a concatenated output; and
generating the classification output based at least in part on the concatenated output.

5. The method of claim 1, wherein the classification output comprises a segmentation map, the segmentation map indicating one or more areas of distress on the component of the gas turbine engine.

6. The method of claim 5, wherein the segmentation map has a plurality of pixels, the pixel value of each of the plurality of pixels corresponding to whether the pixel is associated with an area of distress on the component of the gas turbine engine.

7. The method of claim 1, wherein classifying, by the one or more computing devices, the distress of the component of the gas turbine engine comprises classifying the distress into one of a plurality of distress levels based at least in part on the segmentation map.

8. The method of claim 7, wherein the method further comprises conducting a maintenance action based at least in part on the distress level in which the component of the gas turbine engine is classified.

9. The method of claim 1, wherein the component of the gas turbine engine comprises an engine blade.

10. A system for inspecting a component of a gas turbine, the system comprising:
one or more image capture devices configured to capture a digital images of a component of a gas turbine;
at least one display device;
one or more processors; and
one or more memory devices, the one or more memory devices storing a multi-layer network image classification model, the one or more memory devices further storing computer-readable instructions that when executed by the one or more processors cause the one or more processors to perform operations, the operations comprising:
accessing one or more digital images captured of the component of the gas turbine;
providing the one or more digital images as an input to the multi-layer network image classification model;
generating a classification output for the one or more images from the multi-layer network image classification model;
automatically classifying distress of the component of the gas turbine into one of a plurality of distress levels based at least in part on the classification output; and
providing the distress level of the component of the gas turbine for display on the one or more display devices.

11. The system of claim 10, wherein the multi-layer image classification model comprises a multi-scale fully convolutional model.

12. The system of claim 11, wherein the multi-scale fully convolutional model comprises a plurality of multi-layer networks, each multi-layer network associated with a different size receptive field.

13. The system of claim 12, wherein the operation of generating a classification output from the multi-layer network image classification model comprises:
concatenating outputs from each of the plurality of multi-layer networks to determine a concatenated output; and
generating the classification output based at least in part on the concatenated output.

14. The system of claim 11, wherein the classification output comprises a segmentation map, the segmentation map indicating one or more areas of distress on the component of the gas turbine.

15. The system of claim 14, wherein the classification level is determined based at least in part on a size of the area of distress in the segmentation map.

16. One or more tangible, non-transitory computer-readable media storing computer-readable instructions that when executed by one or more processors cause the one or more processors to perform operations, the operations comprising:
accessing one or more digital images captured of a component of a gas turbine engine;
providing the one or more digital images as an input to a multi-scale fully convolutional model;
generating a segmentation map for the one or more images from a multi-scale fully convolutional model, the segmentation map indicating one or more areas of distress on the component;
automatically classifying distress of the component into one of a plurality of distress levels based at least in part on the segmentation map; and
providing the distress level of the component of the gas turbine engine for display on one or more display devices.

17. The computer-readable media of claim 16, wherein the multi-scale fully convolutional model comprises a plurality of multi-layer networks, each multi-layer network associated with a different size receptive field.

18. The computer-readable media of claim 17, wherein the operation of generating a segmentation map from the multi-layer network image classification model comprises:
concatenating outputs from each of the plurality of multi-layer networks to determine a concatenated output; and
generating the segmentation map based at least in part on the concatenated output.

19. The computer-readable media of claim 16, wherein the segmentation map has a plurality of pixels, the pixel value of each of the plurality of pixels corresponding to whether the pixel is associated with an area of distress on the component of the gas turbine engine.

20. The computer-readable media of claim 19, wherein the gas turbine engine component is classified into one of the plurality of distress levels based at least in part on a number of pixels associated with an area of distress on the component of the gas turbine engine.

* * * * *